United States Patent
San Roman Alerigi et al.

(10) Patent No.: US 12,140,850 B2
(45) Date of Patent: Nov. 12, 2024

(54) RECONFIGURABLE OPTICS FOR BEAM TRANSFORMATION

(71) Applicant: Saudi Arabian Oil Company, Dhahran (SA)

(72) Inventors: Damian Pablo San Roman Alerigi, Al-Khobar (SA); Sameeh Issa Batarseh, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 761 days.

(21) Appl. No.: 16/815,467

(22) Filed: Mar. 11, 2020

(65) Prior Publication Data
US 2021/0286227 A1  Sep. 16, 2021

(51) Int. Cl.
*G02F 1/35* (2006.01)
*E21B 7/15* (2006.01)

(52) U.S. Cl.
CPC . *G02F 1/35* (2013.01); *E21B 7/15* (2013.01)

(58) Field of Classification Search
CPC . G02F 1/35; G02F 1/3503; G02F 1/33; G02F 1/29; E21B 43/11; E21B 7/15; E21B 43/247; E21B 12/06; E21B 47/123
See application file for complete search history.

(56) References Cited

U.S. PATENT DOCUMENTS

| | | |
|---|---|---|
| 6,859,114 B2 | 2/2005 | Eleftheriades et al. |
| 7,015,865 B2 | 3/2006 | Isaacs et al. |
| 7,352,452 B2 | 4/2008 | Wegmann et al. |

(Continued)

FOREIGN PATENT DOCUMENTS

| | | |
|---|---|---|
| CN | 101253392 A | 8/2008 |
| CN | 102155197 A | 8/2011 |

(Continued)

OTHER PUBLICATIONS

D'Amico, C. et al., Ultrafast laser-induced refractive index changes in $Ge_{15}As_{15}S_{70}$ chalcogenide glass, Optical Society of America, 6(6):1-15 (2016).

(Continued)

*Primary Examiner* — Christopher Stanford
*Assistant Examiner* — Journey F Sumlar
(74) *Attorney, Agent, or Firm* — Osha Bergman Watanabe & Burton LLP

(57) ABSTRACT

An example laser system includes one or more optical transmission media that are part of an optical path originating at a laser generator configured to generate an input laser beam. The example laser system includes an analyzer for receiving the input laser beam and for characterizing at least a profile and energy of the input laser beam. The example laser system includes a circulator for receiving the input laser beam from the analyzer and for minimizing or eliminating reflections. The example laser system includes a (Continued)

Gauss beam profile    Gauss-Bessel beam profile beam transformer for receiving the input laser beam from the circulator and for altering at least one property of the input laser beam thereby generating an output laser beam. The example laser system includes a writing head for altering at least one optical property of the beam transformer.

12 Claims, 7 Drawing Sheets

(56) References Cited

U.S. PATENT DOCUMENTS

| | | | |
|---|---|---|---|
| 9,027,668 B2* | 5/2015 | Zediker | E21B 44/00 |
| | | | 175/16 |
| 9,074,422 B2* | 7/2015 | Grubb | B23K 26/1464 |
| 9,138,786 B2* | 9/2015 | McKay | B08B 9/055 |
| 9,772,255 B1 | 9/2017 | Tener et al. | |
| 2009/0147342 A1 | 6/2009 | Rahm et al. | |
| 2010/0044103 A1* | 2/2010 | Moxley | E21B 7/15 |
| | | | 166/65.1 |
| 2010/0059490 A1 | 3/2010 | Unrath et al. | |
| 2012/0074110 A1 | 3/2012 | Zediker et al. | |
| 2016/0251940 A1* | 9/2016 | De Witt | E21B 7/14 |
| | | | 166/304 |
| 2020/0032634 A1 | 1/2020 | Batarseh et al. | |
| 2020/0032635 A1* | 1/2020 | San Roman Alerigi | |
| | | | G02B 6/4206 |

FOREIGN PATENT DOCUMENTS

| | | |
|---|---|---|
| CN | 107567575 A | 1/2018 |
| CN | 109989745 A | 7/2019 |
| EP | 3 657 237 A1 | 5/2020 |
| WO | 2017203271 A1 | 11/2017 |
| WO | WO-2019/163481 A1 | 8/2019 |
| WO | WO-2021/181144 A1 | 9/2021 |

OTHER PUBLICATIONS

Jiangning, L. et al., Multi imaging-based beam shaping for ultrafast laser-material processing using spatial light modulators, Optics and Lasers In Engineering, 112:59-67 (2018).

Written Opinion for PCT/IB2020/055976, 11 pages (mailed Nov. 12, 2020).

Office Action issued in corresponding Chinese Application No. 2020801008131.1; dated May 31, 2024 (19 pages).

* cited by examiner

RECONFIGURABLE OPTICS FOR BEAM TRANSFORMATION

TECHNICAL FIELD

This specification describes examples of configurable laser systems for beam transformation that are usable in a wellbore.

BACKGROUND

Laser-based systems, tools, and methods may be used in the oil and gas industry, for example, in a wellbore to create fluid flow paths through hydrocarbon-bearing rock formations. Laser-based systems and tools may also be used for repair or maintenance in a wellbore, for example, to remove build-up of debris in a casing or liner. Other laser-based systems may be used for measurement of downhole conditions. Laser-based systems may be integrated into other systems or stand-alone devices.

SUMMARY

An example laser system is configured to operate within a wellbore of a hydrocarbon-bearing rock formation. The example laser system includes one or more optical transmission media. The one or more optical transmission media are part of an optical path originating at a laser generator configured to generate an input laser beam. The one or more optical transmission media are for passing the input laser beam. The example laser system includes an analyzer that is part of the optical path. The analyzer is for receiving the input laser beam from the one or more optical transmission media and for characterizing at least a profile and energy of the input laser beam. The example laser system includes a circulator that is part of the optical path. The circulator is for receiving the input laser beam from the analyzer and for minimizing or eliminating reflections. The example laser system includes a beam transformer that is part of the optical path. The beam transformer is for receiving the input laser beam from the circulator and for altering at least one property of the input laser beam thereby generating an output laser beam. The example laser system includes a writing head for altering at least one optical property of the beam transformer.

The analyzer may be or may include one or more devices to analyze laser beam profile or energy of the input laser beam. The circulator may be or may include one or more devices to interrupt the input laser beam and isolate the beam transformer.

The beam transformer may include a transformer element. The transformer element may be composed at least in part of a metamaterial or photorefractive material. At least one optical property of the metamaterial or photorefractive material may change when the metamaterial or photorefractive material is subjected to one or more types of radiation. The photorefractive material may be or include photorefractive glass. The one or more types of radiation may include electromagnetic radiation or electron beam radiation.

The beam transformer may include or may be connected to an output assembly that is part of the optical path. The output assembly is for receiving the output laser beam from the beam transformer and for evaluating or directing the output laser beam to a target. The output assembly may include one or more of a set of optics, a beam profiler, and a sensor.

The writing head may include a liquid crystal array or a micro-lens array. The writing head may include one or more of a wideband laser, a light-emitting diode, and an electron source. The writing head may include a translating or rotating frame.

The writing head may include a liquid crystal array and a micro-lens array, and one or more of a wideband laser, a light-emitting diode, and an electron source. The liquid crystal array or a micro-lens array may receive one or more of a photon beam and an electron beam from the one or more of a wideband laser, a light-emitting diode, or an electron source. The liquid crystal array may alter at least one property of the photon beam or the electron beam. The liquid crystal array may output the photon beam or the electron beam to the beam transformer.

The liquid crystal array and the micro-lens array may be mounted on a translating or rotating frame. The one or more of a wideband laser, a light-emitting diode, and an electron source may be mounted on the translating or rotating frame. The laser system may be integrated into a laser downhole tool for output of the output laser beam to the hydrocarbon-bearing rock formation.

An example method is for manipulating a laser beam. The example method includes altering, by a writing head, at least one optical property of a beam transformer that is part of an optical path. The example method includes passing, through one or more optical transmission media, a laser beam generated by a laser beam generator at an origin of the optical path comprising the one or more optical transmission media. The example method includes receiving, by an analyzer that is part of the optical path, from the one or more optical transmission media the input laser beam and characterizing at least a profile and energy of the input laser beam. The example method includes receiving, by a circulator that is part of the optical path, from the analyzer the input laser beam and minimizing or eliminating reflections. The example method includes receiving, by the beam transformer, from the circulator the input laser beam and altering at least one property of the input laser beam thereby generating an output laser beam.

Altering may include subjecting the beam transformer to one or more types of radiation. The one or more types of radiation may include electromagnetic radiation or electron beam radiation. The method may include translating or rotating one or more components of the writing assembly. The one or more components may include a liquid crystal array and a micro-lens array.

Any two or more of the features described in this specification, including in this summary section, may be combined to form implementations not specifically described in this specification.

At least part of the processes and systems described in this specification may be controlled by executing, on one or more processing devices, instructions that are stored on one or more non-transitory machine-readable storage media. Examples of non-transitory machine-readable storage media include, but are not limited to, read-only memory, an optical disk drive, memory disk drive, random access memory, and the like. At least part of the processes and systems described in this specification may be controlled using a computing system comprised of one or more processing devices and memory storing instructions that are executable by the one or more processing devices to perform various control operations.

The details of one or more implementations are set forth in the accompanying drawings and the description. Other features and advantages will be apparent from the description and drawings, and from the claims.

DESCRIPTION OF THE DRAWINGS

Like reference numerals in the figures indicate like elements.

DETAILED DESCRIPTION

This specification describes examples of laser-based systems and methods that may be used in a variety of downhole applications. Example systems include a photonic, modular, reconfigurable system for transformation of a laser beam profile, for example, the profile of a laser beam with a power of over 1 kilowatt (kW). Beam transformation capabilities of the technologies described in this specification allow a tool including a laser-based system to be used in different devices where the generation of variable (for example, variegated) beam profiles is needed. Each system or tool described in this specification may be used alone or in combination with one or more tools, for example tools of the same kind, for example in series or parallel. In some implementations, a system or tool as described in this specification may be used with other optics/photonics systems, for example, amplifiers, acousto-optic modulators (AOM) (devices that use the acousto-optic effect to diffract and shift the frequency of light using sound waves, for example, at radio-frequency), diffracting gratings (one or more optical components with a periodic structure that split and diffract light into several beams travelling in different directions), liquid crystals, or n-th order wave-plates (optical devices that alter the polarization state of a light wave).

An example laser system or tool as described in this specification relies on the control of a refractive index map. Refractive index (n) is a dimensionless number that described how electromagnetic waves propagate through a medium. It summarizes the inter- and intra-atomic and electronic responses of a material to electromagnetic excitation. These inter- and intra-atomic and electronic responses, in turn, are coded into the fundamental electromagnetic tensors: permittivity $\bar{\varepsilon}$ (electric field $\vec{E}$ response), and permeability $\bar{\mu}$ (magnetic field $\vec{H}$ response). The refractive index n combines them as:

$$n = \bar{\varepsilon}(\vec{E}, \vec{r}, t) \cdot \bar{\mu}(\vec{H}, \vec{r}, t)$$

where $\vec{r}$ is the vector of any point in space, which in Cartesian coordinates takes the form x, y, z; and t is the time coordinate. The electromagnetic tensors are, in general, non-linear, heterogeneous, anisotropic, and time-dependent. Consequently, so is the refractive index.

Figure 1:
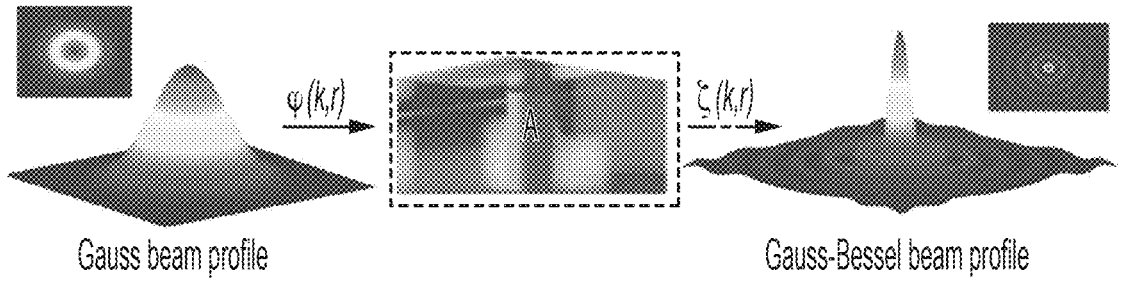
FIG. 1 are graphs and diagrams illustrating refractive index mapping to enable transformation of a first beam profile (left) into a second beam profile (right) by propagating through medium A.

Refractive index mapping as used in this specification refers to a set of mathematical and physical techniques to design the refractive index within a region of space to induce a pre-defined change in an electromagnetic wave passing through said space. This concept is illustrated in FIG. 1. Here, a refractive index map $n(\vec{r}, t)$ is used in a medium A to modify a first, incoming beam profile, φ, (for example, a Gaussian beam profile) into a second beam profile, ζ (for example, a Gauss-Bessel beam profile).

There are multiple techniques to calculate the refractive index map used in medium A needed to achieve a desired transformation. For example, one or more of the following calculation methods may be used: an adjoint problem method (a numerical method for efficiently computing the gradient of a function or operator in a numerical optimization problem), linear sampling (a method to reconstruct a shape of an obstacle in time-harmonic inverse scattering without a priori knowledge of either the physical properties or the number of disconnected components of the scatterer), variational methods (analyses that use small changes in functions and functionals to find maxima and minima of functionals), or variational adjoint solutions. In some implementations, one or more calculation methods may be used in combination with transformation optics (techniques involving metamaterials to produce spatial variations) to implement a refractive index map. Metamaterials include materials engineered to have a property (for example, an optical property) that is not found in naturally occurring materials. The example problem used in this specification is in general non-trivial and non-unique. Therefore, there may be more than one refractive index map that yields the same solution.

In some implementation, photo-refraction may be used to implement a refractive index map in a medium, for example, to alter one or more incident beam profiles. Photo-refraction is a non-linear effect found in certain crystals and glasses that respond to radiation (for example, light) by changing their refractive index. Depending on the intensity, frequency, and time of exposure the change can be permanent or reversible (for example, like in a re-writable compact disc). There are different materials that present these properties, such as chalcogenide glasses (for example, $As_2S_3$), or compound semiconductors (for example, Si, $Si_{\{1-y\}}O_y$, $Si_{\{1-x-y\}}Ge_xC_y$), ferroelectric oxides (for example, $BaTiO_3$), or sillenites (BSO), or combinations of such materials. In some implementations, glass materials may be used as these materials may exhibit an electro-optical response, photo-conductivity, and low-dark conductivity. In some implementations, materials with high electro/optical-refractivity (>1%/mW for light in the UV range of the spectra, or >0.1%/Electronvolt (eV) in the case of electron beams) may be used. In some implementations, photoconductivity activation ranges may lie between 0.2 to 0.5 eV. In some implementations, photoconductivity may exceed 1 E-12/(Ohm cm).

Figure 2:
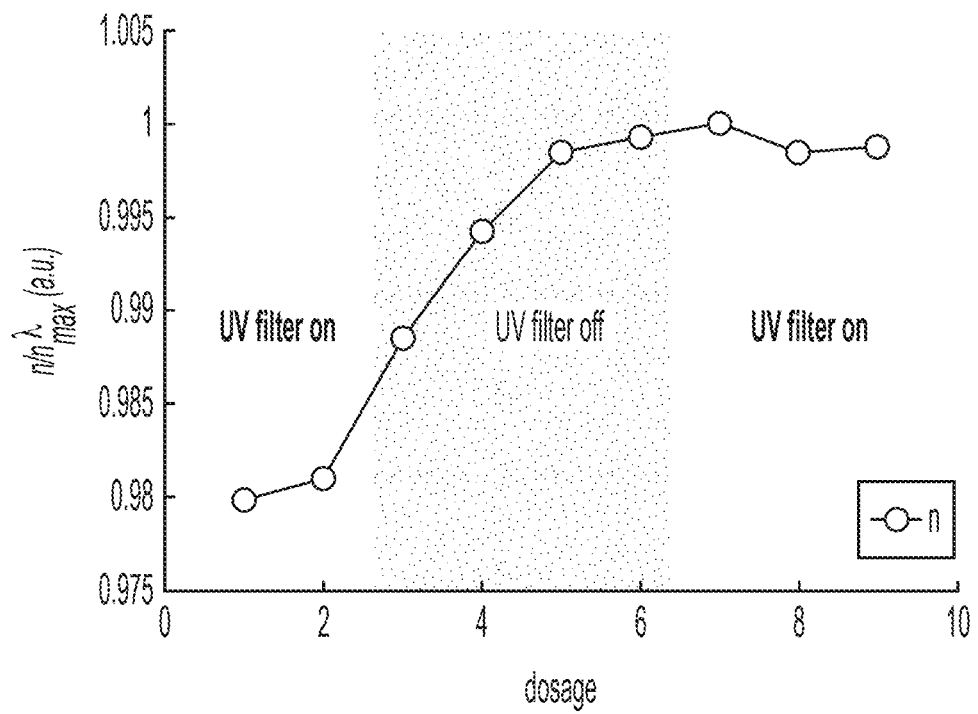
FIG. 2 is a graph showing refractive index change in $As_2S_3$ chalcogenide glass.

For example, the graph in FIG. 2 illustrates refractive index change in $As_2S_3$ chalcogenide glass. The material changes its refractive index after being illuminated with UV-light. The dosage is determined by the photon flux and time of exposure. In this case, photon flux is constant and time exposure increases. The refractive index change may depend on the dosage and frequency of the light used to induced the change. The refractive index change may be reversible or permanent depending on the photon flux and energy.

In some implementation, electron-refraction may be used to implement a refractive index map in a medium, for example, to alter one or more incident beam profiles. Electron-refraction is a non-linear effect found in certain crystals and glasses that respond to electron illumination by changing their refractive index, for example, in chalcogenide glasses, or compound semiconductors, for example, silicon-germanium-carbon semiconductors. Electron irradiation affects the real and imaginary parts of the complex refractive index n. Thus, it is possible to use electron-induced refractive index changes to modify absorption as well as refraction effects in these materials.

Figure 3A:
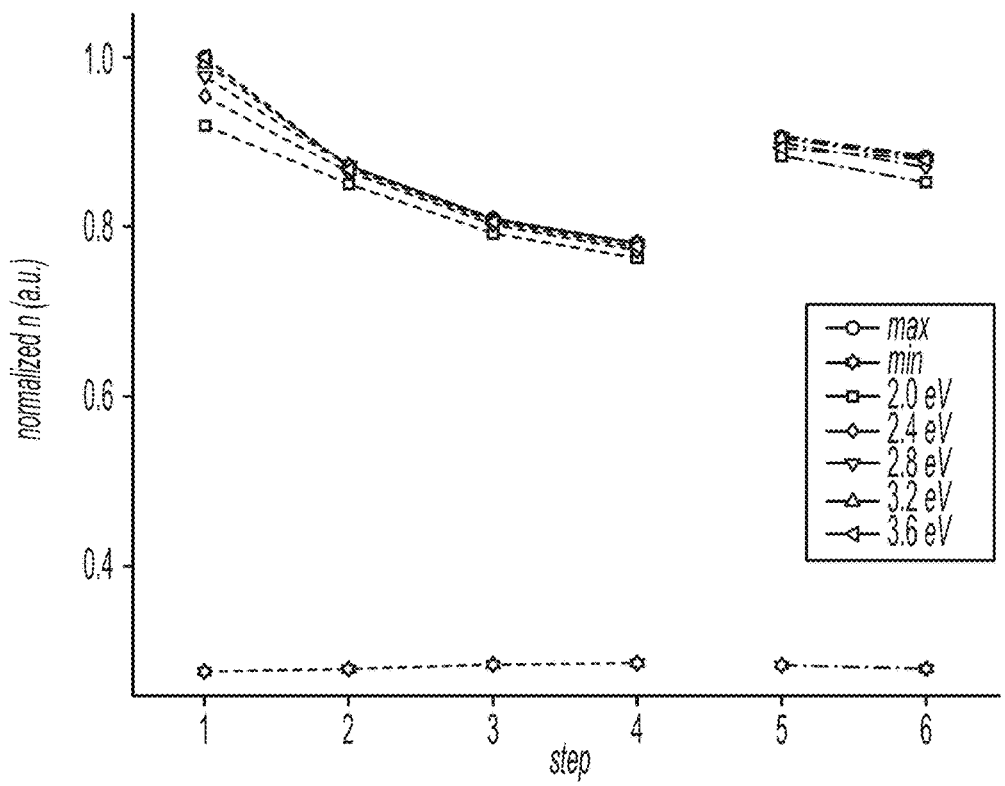
FIG. 3A is a graph showing the real part of electron-induced refractive index change in $As_2S_3$ at different irradiation energies (in eV) and exposure time, identified as steps in time in the graphs.
Figure 3B:
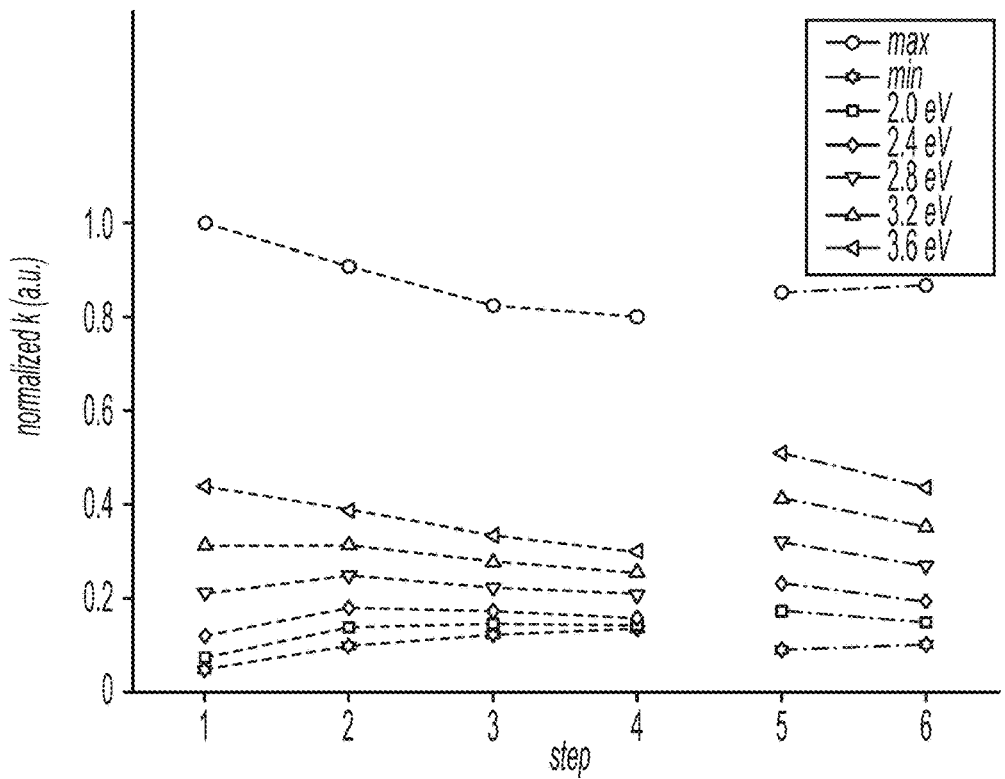
FIG. 3B is a graph showing the imaginary part of electron-induced refractive index change in $As_2S_3$ at different irradiation energies (in eV) and exposure time, identified as steps in time in the graphs.

For example, FIG. 3A and FIG. 3B illustrate electron-induced refractive index change in $As_2S_3$ at different irradiation energies (eV) and exposure time, identified as steps in time in the graphs. Electrons induce changes to the real part (FIG. 3A) and the imaginary part (FIG. 3B) of the complex refractive index n. The step denotes the applied electron irradiation dose in keV. Electron irradiation thus can change the absorption and refraction pattern of light passing through a material such as $As_2S_3$.

Figure 4:
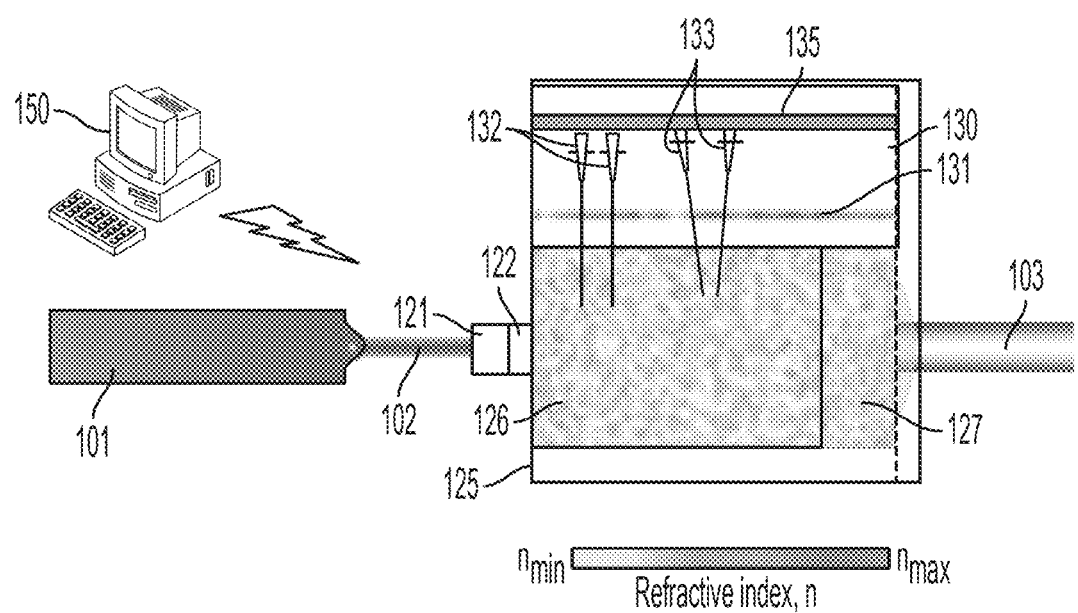
FIG. 4 is a cross-sectional diagram of an example laser system along a laser beam axis (longitudinal view).
Figure 5:
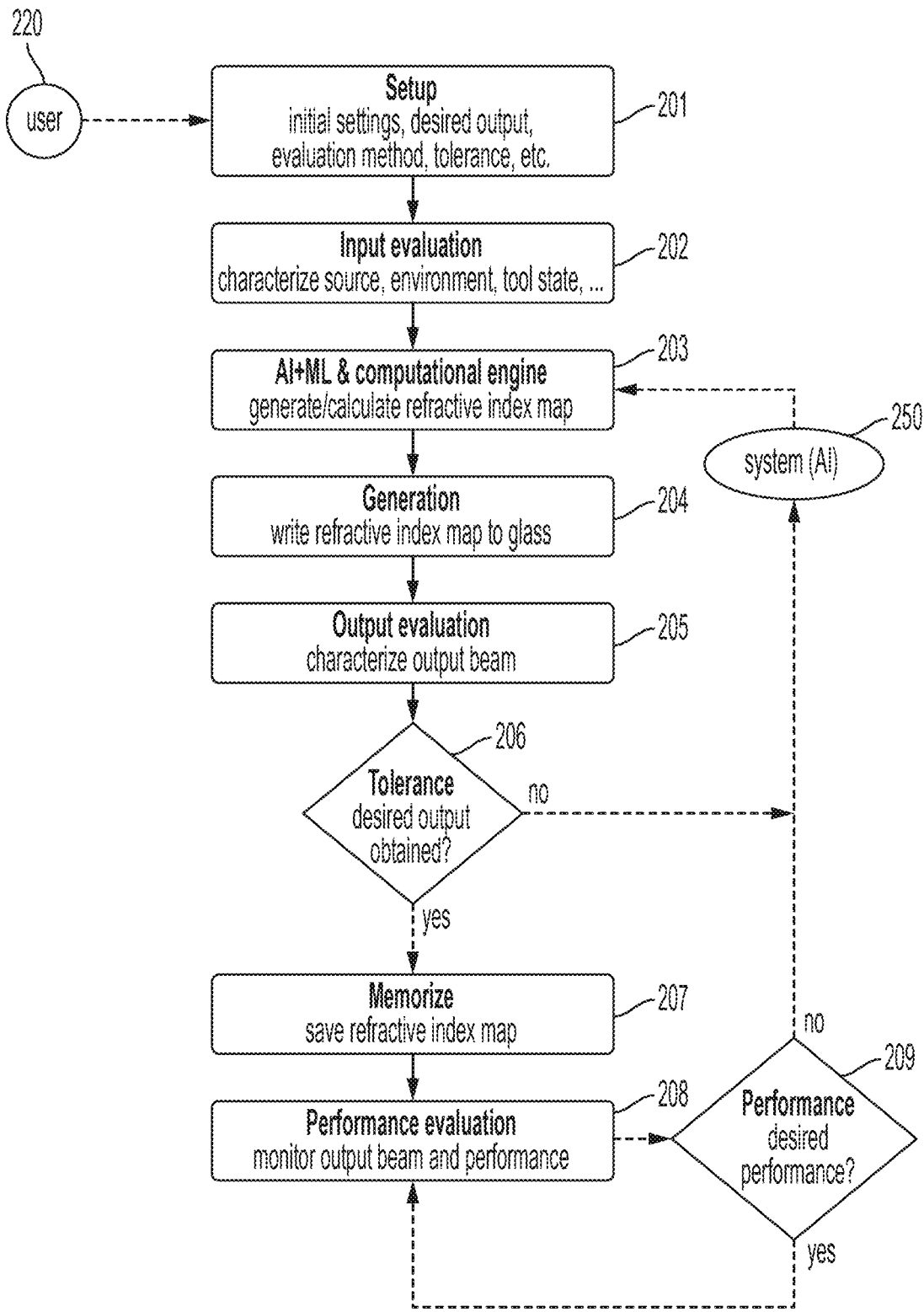
FIG. 5 is a flow chart illustrating an example operation of an example laser system.

An example laser system based at least in part on the principles related to refractive indices and refractive index maps implemented in a medium to transform an incident light beam is illustrated in FIG. 4. A flow chart illustrating an example operation of an example laser system is shown in FIG. 5. A computing system, for example, control system 150, may be configured—for example, programmed—to control operation of the laser system. Examples of computing systems that may be used are described in this specification. Signals may be exchanged between one or more of the components of the laser system, for example, via fiber-optic media. In some implementations, a control system 150 is located uphole on the surface. In some implementations, a control system 150 is located at least in part downhole.

An example laser system as described in this specification may include one or more electrical or optical components. In some implementations, an example system may include one or more optical transmission media, for example, one or more fiber optic cables, prisms, lenses, or mirrors. One or more optical transmission media may be part of an optical path that originates at a laser generator (not shown) configured to generate a laser beam, for example input laser beam 101. In some implementations, a laser system may include an analyzer that may be part of the optical path, for example, an analyzer 121. An analyzer 121 may receive an input laser beam (for example, input laser beam 101) from one or more optical transmission media (not shown) and may be used to characterize the input laser beam. An analyzer may be part of or connected to a computing system, for example control system 150. In some implementations, a beam profile (for example, input profile 102 of an example input laser beam 101) or energy of the input laser beam may be characterized, for example, using a beam profiler (not shown). In some implementations, a beam profiler may utilize a camera and one or more filters to generate a two-dimensional energy distribution profile of a laser beam. In some implementations, a beam profiler may measure scattered light passing through a circular aperture of known diameter to determine laser beam energy distribution. The energy distribution of the beam is the power distribution, i.e., the magnitude of the Poynting vector (a vector that represents the directional energy flux (the energy transfer per unit area per unit time) of an electromagnetic field).

In some implementations, a laser system may include a circulator that may be part of the optical path, for example, a circulator 122. A circulator, for example, an optical circulator, may be or include a three- or four-port optical device configured such that light entering any port exits from the next. A circulator may receive an input laser beam (for example, input laser beam 101), for example, from an analyzer 121, and may minimize or eliminate undesired reflections prior to transmitting the beam to another device, for example, beam transformer 125. Reflections may occur because of changes in the impedance between different media or materials. This is a natural phenomenon that may occur due to the impedance mismatch at the interface (boundary) between two materials. Thus, as light propagates from one material to another, a portion of energy will reflect. In some implementations, an analyzer and a circulator may be combined into one device. In some implementations, an analyzer and a circulator may be separate devices.

In some implementations, a laser system may include a beam transformer that is part of the optical path, for example beam transformer 125. A beam transformer may receive an input laser beam, for example, from the circulator, and may alter one or more properties of the input laser beam. In some implementations, a beam transformer, for example, beam transformer 125 may generate an output laser beam 103. In some implementations, a beam transformer is or includes one or more transformer elements 126. A transformer element 126 may perform as a medium (for example, medium A as shown in FIG. 1) to transform an incident light beam profile. In some implementations, a transformer element 126 may be composed at least in part of a metamaterial or photorefractive material. In some implementations, at least one optical property of a metamaterial or photorefractive material changes when the metamaterial or photorefractive material is subjected to one or more types of radiation. In some implementations, a metamaterial may include, for example, chalcogenide glasses, or materials used semiconductors, for example, silicon-germanium-carbon compounds. In some implementations, a beam transformer may include or may be connected to an output assembly that is part of the optical path, for example, output assembly 127. In some implementations, an output assembly 127 receives a laser beam, for example, from a beam transformer or transformer element, and directs the output laser beam 103 to a target. In some implementations, an output assembly 127 may include one or more of: one or more optical elements (for example, one or more lenses, collimators, prisms, or fiber optics), one or more beam profilers, and one or more sensors. An output assembly 127 may be part of or connected to a computing system, for example control system 150. In some implementations, an output assembly 127 receives a laser beam, for example, from a beam transformer or transformer element, and may be used to generate data for beam analysis or evaluation.

In some implementations, a laser system may include one or more writing heads, for example, writing head 130, for altering at least one optical property of one or more transformer elements 126. In some implementations, a beam transformer, for example, beam transformer 125, may include one or more writing heads, for example, writing head 130. In some implementations, a writing head may be or may include an array, for example array 131, for example, a liquid crystal array or a micro-lens array, or both. In some implementations, a writing head 130 may include one or more optical elements (not shown) such as collimators, lenses, apertures, and diffraction gratings, fiber out-coupler that may be used in combination with an array 131. In some implementations, the one or more optical elements may direct or otherwise manipulate one or more photon beams (for example, a laser beam) or electron beams. In some implementations, arrays 131 (for example, micro-lens arrays) with variable focal lengths may be fabricated using liquid crystals and tunable electric fields. In some implementations, a focal length (for example, of a micro lens array) may be changed dynamically. In some implementations, a writing head includes and one or more of a wideband laser, a light-emitting diode, and an electron source, for example light emitting diode 132 and electron source 133. In some implementations, an array 131 (for example, a liquid crystal array or a micro-lens array) may receive one or more of a photon beam and an electron beam from one or more of a wideband laser, a light-emitting diode 132, or an electron source 133. In some implementations, an array 131 (for example, a liquid crystal array or a micro-lens array) may alter at least one property of the photon beam or the electron beam.

In some implementations, an array, for example array 131, may be mounted on a moving (for example, translating or rotating) frame, for example frame 135. In some implementations, one or more of a wideband laser, a light-emitting diode, and an electron source (for example light emitting diode 132 and electron source 133) may be mounted on a moving frame, for example, frame 135. In some implementations, a moving frame, for example, frame 135, may provide translation of a light beam or electron beam, thereby providing a light beam or electron beam to one or more discrete location within a volume, for example, a volume of one or more transformer elements 126.

In some implementations, an array, for example array 131, may output a photon beam or an electron beam to one or more transformer elements 126. In some implementations, the output of the photon beam or the electron beam, or both, may cause alteration of one or more optical properties of transformer element 126. In some implementations, the alteration may occur in accordance to refractive index map. Alteration of the one or more optical properties of transformer element 126 may cause transformation or alteration of one or more properties of an input laser beam 101 (for example, alteration of one or more profiles 102). A transformed laser beam may be output by a beam transformer 125 or transformer element 126 as output laser beam 103.

An example operation of an example laser system as described in this specification is illustrated in FIG. 5.

At the setup stage 201, a user 220 may set input beam parameters of an input laser beam 101 and may set one or more desired output parameters, tolerances, mode of operation, performance goals of an output laser beam 103. In some implementations, tolerances include desired, minimal, or maximal discrepancy between actual beam shape and expected beam shape of output laser beam 103. In some implementations, parameters of an input laser beam include, for example, energy distribution (for example, Gaussian or Flat-top); wavelength(s) (for example, between 500 and 1500 nanometers (nm), between 700 and 1300 nm, between 900 and 1100 nm, between 200 and 600 nm, or between 300 and 500 nm, or wavelength of about 1064 nm+/−10 nm or 446 nm+/−5 nm); or performance goals (for example, the range of accessible refractive index values supported by a material used for a transformer element 126).

In some implementations, for example, if available, an educated guess of a starting refractive index map may be set by user 220. For example, if transformation of a Gaussian beam profile into a Bessel beam profile were desired, then a conic-like shape with an increased refractive index at or near the center of transformer element 126 may be applied as an initial guess. In some implementations, this educated guess may be based in part on pre-calculations, for example, using the tools described in this specification.

If an initial refractive index map is not provided, the system may calculate an initial map based on training data or by solving an inverse problem using the methods described in this specification. The input laser beam 101 may have an initial transversal profile 102. In some implementations, a beam profile 102 of input laser beam 101 may be known, for example, provided by the manufacturer of the laser/light source. In some implementations, a beam profiler may be used to adequately measure beam profile 102 of input laser beam 101. In some implementations, an example laser system may include a beam profiler to measure the actual output of a laser generator. Data from a beam profiler may be used by the control system to provide feedback about quality of laser beam transformation.

In some implementations, a laser input beam 101 may be generated by a laser beam generator at the surface outside wellbore. In some implementations, a laser input beam 101 may be generated by a laser beam generator downhole or in-situ. In high-power laser applications (for example, using a laser with a power output of >1 kW), laser input beam 101 is generated at a surface or in-situ. In some implementations, high-power laser beams may be used to drill one or more holes in a wellbore, for example, in a rock formation or casing.

At the input evaluation stage 202, an input beam 101 may pass through an analyzer (e.g., analyzer 121) or circulator (e.g., circulator 122), or both. In some implementations, an analyzer characterizes the profile and energy of an input beam. In some implementations, a circulator may be used to minimize/eliminate undesired reflections in a system. In some implementations, about 99%, about 90%, about 80%, about 70% or about 60% of reflections are removed. In some implementations, a circulator 122 may be used to interrupt a laser beam, for example, an input laser beam, and to optically insulate one or more components of the laser system. In some implementations, a laser beam passes from analyzer 121 or circulator 122 to a transformer device, e.g., beam transformer 125.

At the computation stage 203, a refractive index map required to attain a desired output beam is determined, for example, using a computing system, for example, control system 150. Control system 150 may include an artificial intelligence system 250. In some implementations, a refractive index map may be determined at least in part based on an evaluation of the input laser beam 101, for example, based on data obtained from analyzer 121. In some implementations, a refractive index map may be determined at least in part based on known initial parameters of an input laser beam. In some implementations, a refractive index map may be determined based on a combination of an evaluation of an input laser beam and known initial input laser beam parameters. In some implementations, determination or computation may include application of the methods described supra in this specification to solve the inverse problem (see, for example, Damian P. San-Roman-Alerigi, et. al. "Generation of J0-Bessel-Gauss beam by a heterogeneous refractive index map."; Journal of the Optical Society of America A Vol. 29, Issue 7, pp. 1252-1258 (2012)). In some implementations, determination or computation may include Machine Learning (ML) or Artificial Intelligence (AI), or both, to find determine a refractive index map or an approximation given a set of input parameters. In some implementations, determination or computation may be based at least in part on computational methods combining modeling and experimental data. In some example implementations, a laser system may utilize beam propagation methods to evaluate an output resulting from random refractive index maps. Beam propagation methods (BPM) are known electromagnetic simulators that solve Maxwell's equations for a given harmonic input. Input values include a refractive index at every point of a material and the input beam parameters (peak power, distribution, wavelength). In some example implementations, a laser system may incorporate known results from the literature, experimental data, or operational data, or a combination of these, to determine a refractive index map.

At the generation stage 204, a resulting refractive index map is applied to one or more transformer elements 126. Transformer element 126 may be or may include a block of a photo-refractive glass or metamaterial block. One or more writing heads 130 may receive a refractive index map, for example, from a computing system, for example, control system 150, and may transcribe or inscribe refractive index map to a volume of one or more transformer elements 126. In some implementations, transcribing or inscribing a refractive index map may include, for example, manipulating material properties of one or more transformer elements 126 at one or more discrete points in the volume of one or more transformer elements 126.

A wideband laser, a light-emitting diode, or an electron source, for example light emitting diode 132 or electron source 133, may be used to manipulate of modify the optical properties of one or more transformer elements 126. A wideband laser, a light-emitting diode, or an electron source, for example light emitting diode 132 or electron source 133, may emit a photon beam or electron beam (or both) that affects the optical properties of one or more transformer elements 126. The magnitude of the refractive index change in transformer element 126 may depend on one or more properties of the photon beam or electron beam. Example photon beam or electron beam properties include photon/electron energy, for example, as provided by the frequency of the photons or electrons at their respective sources. Example photon beam or electron beam properties may include intensity, for example, flux of photons/electrons per unit of volume and time.

In some implementations, to manipulate or modify the optical properties of one or more transformer elements 126, one or more photon beams or electron beams are emitted from one or more writing heads, for example, writing head 130, and focused at different distances within the volume of one or more transformer elements 126. In some implementations, one or more transformer elements 126 may be or may include a transformation glass volume. In some implementations, to modify the optical properties of one or more transformer elements 126, intensity of one or more photon beams or electron beams emitted from one or more writing heads 130 is controlled, for example, by means of variable attenuation. In some implementations, attenuation refers to a photo-darkening effect, for example, a material's change in absorption rate for a given wavelength based on the energy of light applied in the writing head. A writing head 130 may include a moving frame, for example, frame 135.

Figure 6A:
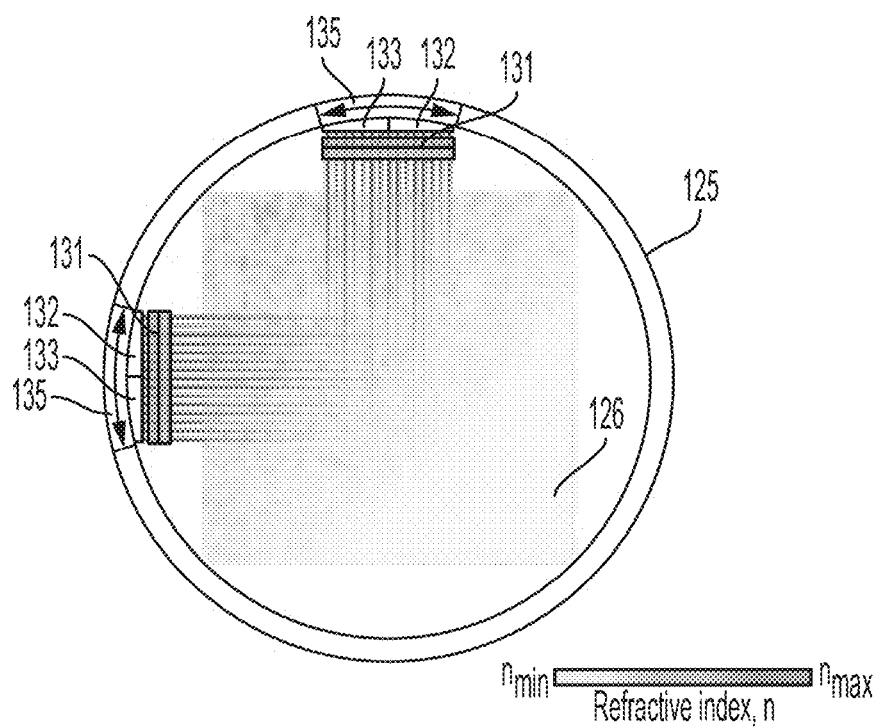
FIG. 6A and FIG. 6B are cross-sectional diagrams of example laser beam transformers perpendicular to a laser beam axis (transversal view).
Figure 6B:
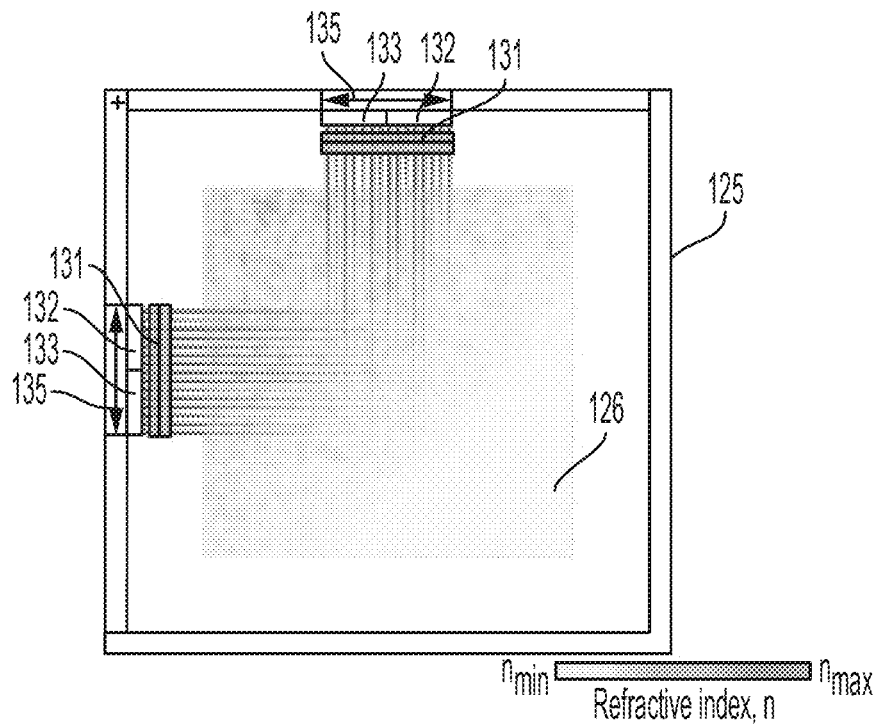

FIG. 6A and FIG. 6B show transversal diagrams (perpendicular to a laser beam axis, for example, a laser beam 101) of example beam transformers 125 including one or more transformer elements 126. In some implementations, components of a writing head may be implemented in a rotational system (FIG. 6A) or in a Cartesian system (FIG. 6B). In some implementations, a writing head or components of a writing head may be translatable in one or more radial (FIG. 6A) or linear directions (FIG. 6B) to access a point in a 3D volume. In some implementations, magnitude of the change in refractive index may depend on a combination of energy and intensity of a photon beam or electron beam. A refractive index change in a material may occur only when an example photon beam or electron beam is above a certain energy threshold (a threshold depending on the material used). In some implementations, depth of penetration of photon beam or electron beam may be controlled by varying beam energy or intensity. In some implementations, two writing heads may be used to enhance control over the refractive index change, for example, by setting one or more writing beams to a level such that a refractive index change in one or more transformer elements 126 occurs only where and when two beams are superimposed (for example, as illustrated in FIG. 6A and FIG. 6B). In some implementations, a single writing head may be used. An example single writing head may use, for example, one or more lenses to focus a photon beam or electron beam at different depths of one or more transformer elements 126.

Figure 7A:
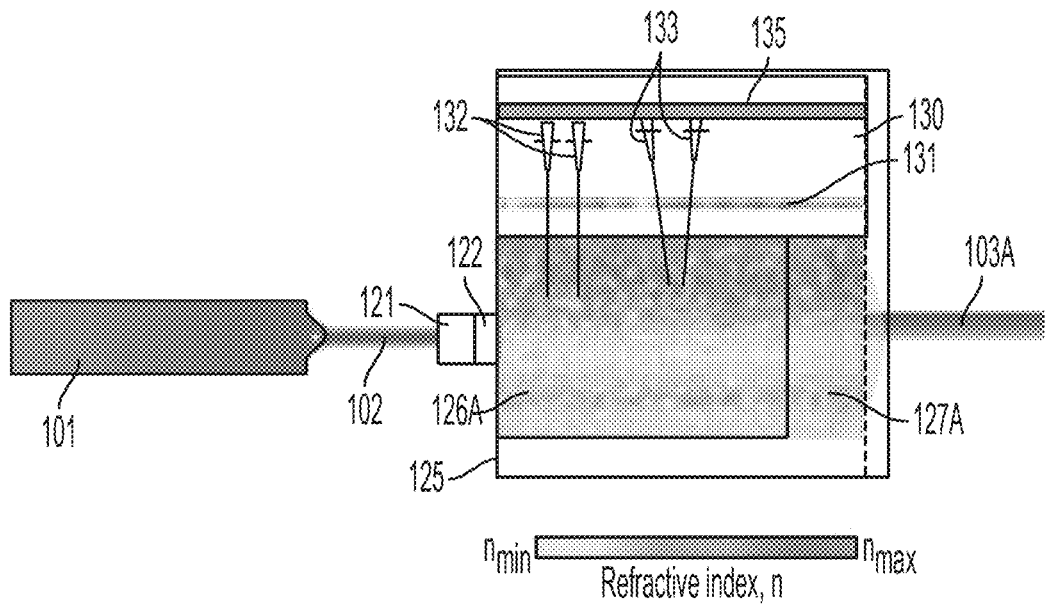
FIG. 7A and FIG. 7B are cross-sectional diagrams of example laser systems along a laser beam axis (longitudinal view).
Figure 7B:
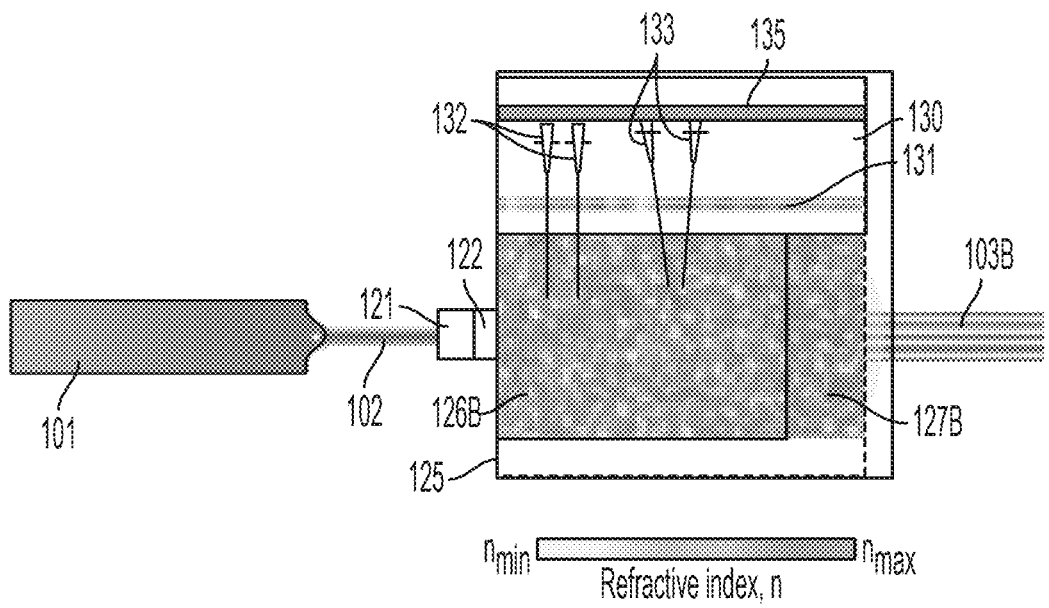

The net result may include one or more transformer elements 126 that exhibit (refractive) optical properties that vary along or across an axis of one or more transformer elements 126 according to the refractive index map transcribed or inscribed in a material of transformer element 126. Thus, one or more transformer elements 126 diffract/refract an incident beam, for example, input laser beam 101, into a beam exhibiting a desired transversal energy redistribution. A refractive index map may be fully heterogeneous, modulated, or homogeneous. In some implementations, depending on the properties of beam transformer element materials, (birefringent) patterns may be controlled by using the same method. Different beam profiles that may be obtained, are illustrated in FIG. 7A and FIG. 7B. In an example implementation illustrated in FIG. 7A, a layered refractive index pattern in an example transformer element 126A together with output assembly 127A may produce a gradient across a profile of an output laser beam 103A. In an example implementation illustrated in FIG. 7B, a heterogeneous or random refractive index pattern in an example transformer element 126B together with output assembly 127B may layered or heterogeneous profile of an output laser beam 103.

At the output beam evaluation stage 205, an output assembly 127 including a set of optics, a beam profiler, or sensors may be used to evaluate and direct the transformed output beam 103. In some implementations, a computing system, for example, control system 150 that may include an artificial intelligence system 250, may calculate the difference between an output beam profile and one or more desired profiles. In some implementations, if the difference is larger than a predetermined tolerance (step 206), a control system 150 may execute an iterative algorithm to correct the refractive index map. In some implementations, if the is difference is smaller than a predetermined tolerance (step 206), applied parameters (for example, a refractive index map) are saved to a memory of control system 150 (step 207). In some example implementations, tolerances may be given as percentage difference between the measured and desired output beams, for example 10%, 5%, 2%, or 1%.

During the performance of an example laser system, one or more output beams 103 are generated. In some implementations, a laser system may include one or more control sensors, for example, to measure an effect of the output laser beam 103 on one or more transformer elements 126 or the effect of a laser beam (for example, input laser beam 101) on the refractive index map writing process. Example sensors that may be used with the systems described in this specification include scattering beam analyzers, LIDAR (Light Detection and Ranging), and reflectometers. In some implementations, one or more sensors may integrated into a beam transformer 125, for example, into output assembly 127. In some implementations, data from one or more sensors may be transmitted to a computing system, for example, control system 150 and may be used, by the system, to modify a beam, for example, using one or more techniques described in this specification to obtain the desired performance. In some implementations, a refractive index map is transcribed or inscribed once to one or more transformer elements 126. One or more transformer elements 126 may be made of a material that may be modified by an electron beam or photo beam only once. In some implementations, one or more transformer elements 126 may be or may include material to which a refractive index map may be written multiple times. This may allow an iterative approach during which a refractive index map is iteratively transcribed or inscribed to one or more transformer elements 126.

In some implementations, a corrective learning approach may lead to the generation of specifically designed or unique beam designs for a given application. In some implementations, such a unique beam design may refer to a desired shape that is not a traditional beam profile (for example, Gaussian, Laguerre, or Bessel profile). In some implementations, for a given example laser operation in subsurface, desired beam profile may be of a novel and unique profile (for example, triangular, oval, anisotropic). As described in this specification, an algorithm may be executed applying a measured or predetermined input profile or a random beam distribution. A refractive index map may then be determined iteratively until a solution converges to a desired output shape. In some implementations, for example, subsurface implementations, this process may be executed by continuously monitoring the laser shape of the transformed beam (step 208). In some implementations, if, during laser operations, one or more parameters of an output laser beam 103 deviates from a predetermined value, a new refractive index map may be calculated and transcribed or inscribed to one or more transformer elements 126 to modify or replace an existing index profile in one or more transformer elements 126 (step 209).

In some implementations, a laser system as described in this specification may be used to transform one or more low-power beams, for example, one or more laser beams with a power of <1 kW. In example low-power implementations, one or more transformer elements 126 may be or may include transformation glass (or other material) that is transparent at the wavelength of the beam. A transformation material used in low-power applications may have a lower absorption than material used for high power applications.

Without wishing to be bound by theory, photo- or electron-induced effects in a material used for a transformer element 126 are a function of energy and wavelength. Linear electromagnetic absorption of a material is a function of wavelength. The writing heads 130 may use light of a given wavelength and power as required to change a refractive index in one or more transformer elements 126. These wavelengths and power values may be different from those of an input laser beam 101. In some implementations, an input laser beam 101 may be of lower energy than a band-gap (a wavelength at which photons may be prevented from propagating through a material). For example, for chalcogenides, energy values may include: photo-refractive writing beam: 250-400 nm, input laser beam: >1000 nm.

In some implementations, a laser system is rotationally invariant. An output laser beam 103 may be rotationally symmetric. In some implementations, a laser system may include one or more transformer elements 126 that are birefringent. An output laser beam 103 may be rotationally asymmetric.

Figure 8A:
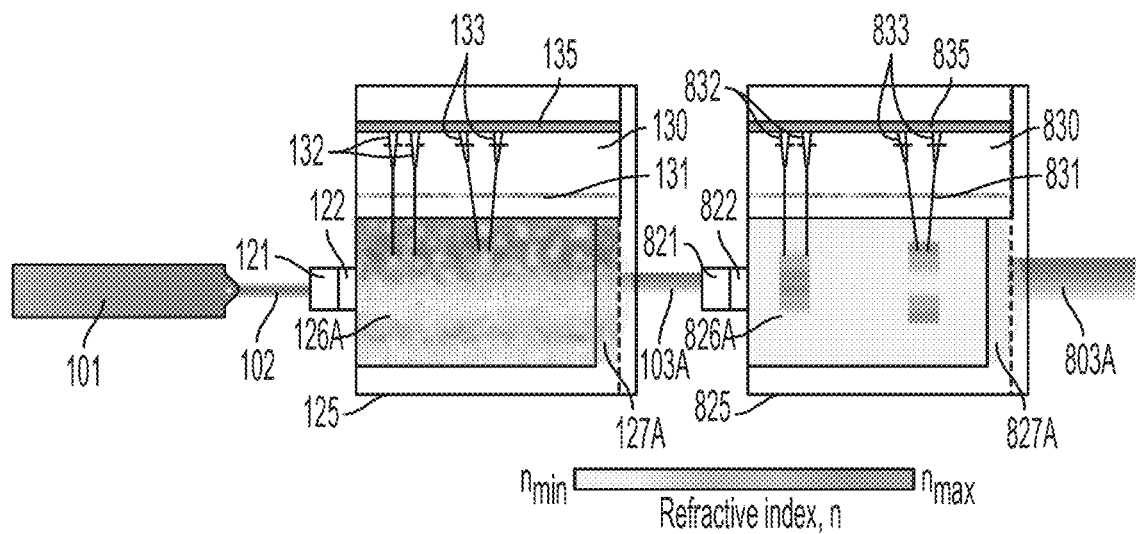
FIG. 8A and FIG. 8B are cross-sectional diagrams of example laser systems with two transformers along a laser beam axis (longitudinal view).
Figure 8B:
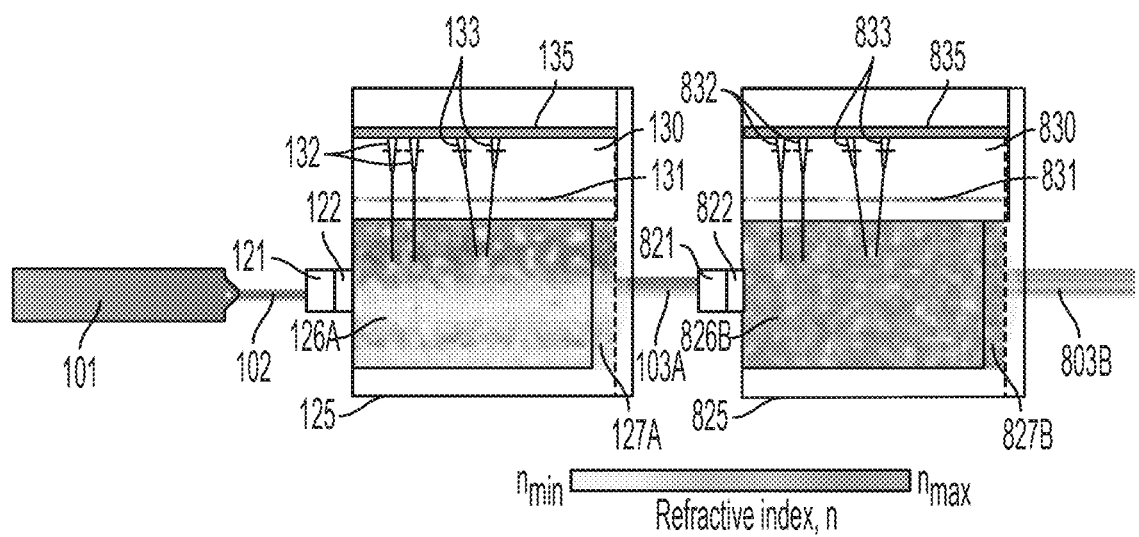

In some implementations, a laser system may be modular. Multiple devices (for example, multiplex devices) may be concatenated to attain different results, for example, as shown in FIG. 8A and FIG. 8B. Multiple devices (for example, multiplex devices) may provide on-demand beam expanders, beam contractors, beam shape modifiers, or beam modulators, or combinations of such multiple devices. In some implementations, a system may include a second beam transformer 825 including a second analyzer 821, a second circulator 822, one or more second transformer elements, for example, second transformer elements 826A or 826B, one or more second output assemblies, for example, second output assemblies 827A or 827B, and one or more second writing heads 830. One more second writing heads 830 may include one or more of a second wideband laser, a second light-emitting diode, and a second electron source, a second light emitting diode, for example, a second light-emitting diode 832 or second electron source 833, or both. One more second writing heads 830 may include second frame 835, for example, for mounting one or more of a second wideband laser, a second light-emitting diode 832, and a second electron source 833. One more second writing heads 830 may include a second array, for example second array 831. Second array 831 may be or include a liquid crystal array or a micro-lens array, or both. FIG. 8A illustrates an example first beam transformer 125 with a transformer element 126A having a layered refractive index pattern and a second beam transformer 825 with a second transformer element, for example second transformer element 826A having a layered refractive index pattern in two distinct zones within a second transformer element 826A. A beam transformer 125 may output an output laser beam 103A, which serves as an input for second beam transformer 825. A second beam transformer 825 may output a second output laser beam, for example, output laser beam 803A. FIG. 8B illustrates an example first beam transformer 125 with a transformer element 126A having a layered refractive index pattern and a second beam transformer 825 having a second transformer element, for example second transformer element 826B with a random refractive index pattern. A second beam transformer 825 may output a second output laser beam, for example, output laser beam 803B.

In some implementations, one or more transformer elements 126 may be fabricated, or refractive maps may be written, to achieve beam anisotropy. In some implementations, polarization of a beam may be manipulated. An incident beam may be converted into a Laguerre-Gaussian, Bessel-Gaussian, Hermite-Gaussian, or Airy beams (a non-diffracting waveform) for subsurface photonic applications in Oil & Gas. For example, non-linear beams may be self-healing: non-linear beams may propagate further into a material without diffracting. In some example implementations, a hollow circular beam (Laguerre) may be used for coring applications, for example, to remove a core from a rock formation.

Described in this specification are technologies that utilize reconfigurable materials (for example, configurable glass) that may incorporate a refractive index map that may alter or transform the transversal profile of a laser beam. For example, the technologies may be used to transform a Gaussian beam into a ring (Bessel or Laguerre-Gaussian) beam. The described technologies are based on solutions for photonic integrated systems, which may offer several benefits over other systems for beam manipulation, for example, lens-, mirror-, or collimator-based systems. Potential benefits of the technologies described in this specification include simplicity of design, for example, by using a monolithic (single piece) beam transformer element, for example, transformer element 126. Reducing the number of (moving) parts in a system may reduce failure rate and may reduce susceptibility of a system to vibrations. Potential benefits of the technologies described in this specification include low absorption in the IR spectrum (for example, <5% for wavelengths>1000 nm), for example, by using chalcogenide or similar photo-refractive materials for transformer element 126. Lasers are typically in the IR range and it is desirable to minimize power loss. Thus, it is important to manipulate the beam without affecting the overall energy. Furthermore, optical absorption leads to heating of the material in a system, which may then need an active cooling. If a device has low absorption then cooling may be accomplished passively (for example, by natural radiation or convection heat transfer to the surroundings or to a heatsink). Hence, eliminating active cooling may reduce the complexity of downhole tools and systems. Fewer components compared to, for example, lens-based systems, may also reduce complexity of thermal management, for example, requiring fewer parts to be cooled. Photo-refractive materials may dissociate at certain temperatures, for example, above 150 degrees Celsius (° C.). In some materials, a refractive index may be dependent of the temperature of transformer element 126. In some implementations, a laser system as described in this specification may include one or more cooling systems, for example, to cool or control the temperature of transformer element 126.

Other potential benefits of the technologies described in this specification include the capability of the system to create complex beam shapes, for example, using reconfigurable (re-writable) glass that can change a diffractive or refractive index map configuration on-demand. Potential benefits of the technologies described in this specification may include low system power consumption (for example, <1000 W) by using super-luminescent light emitting diodes (S-LED), light emitting diodes (LED), and low-power semiconductor lasers to transcribe a refractive index map to a transformer element 126.

At least part of the laser tool system and its various modifications may be controlled by a computer program product, such as a computer program tangibly embodied in one or more information formation carriers. Information carriers include one or more tangible machine-readable storage media. The computer program product may be executed by a data processing apparatus. A data processing apparatus can be a programmable processor, a computer, or multiple computers.

A computer program may be written in any form of programming language, including compiled or interpreted languages. It may be deployed in any form, including as a stand-alone program or as a module, component, subroutine, or other unit suitable for use in a computing environment. A computer program may be deployed to be executed on one computer or on multiple computers. The one computer or multiple computers can be at one site or distributed across multiple sites and interconnected by a network.

Actions associated with implementing the systems may be performed by one or more programmable processors executing one or more computer programs. All or part of the systems may be implemented as special purpose logic circuitry, for example, an field programmable gate array (FPGA) or an ASIC application-specific integrated circuit (ASIC), or both.

Processors suitable for the execution of a computer program include, for example, both general and special purpose microprocessors, and include any one or more processors of any kind of digital computer. Generally, a processor will receive instructions and data from a read-only storage area or a random access storage area, or both. Components of a computer (including a server) include one or more processors for executing instructions and one or more storage area devices for storing instructions and data. Generally, a computer will also include one or more machine-readable storage media, or will be operatively coupled to receive data from, or transfer data to, or both, one or more machine-readable storage media. Machine-readable storage media include mass storage devices for storing data, for example, magnetic, magneto-optical disks, or optical disks. Non-transitory machine-readable storage media suitable for embodying computer program instructions and data include all forms of non-volatile storage area. Non-transitory machine-readable storage media include, for example, semiconductor storage area devices, for example, erasable programmable read-only memory (EPROM), electrically erasable programmable read-only memory (EEPROM), and flash storage area devices. Non-transitory machine-readable storage media include, for example, magnetic disks, for example, internal hard disks or removable disks, magneto-optical disks, and CD-ROM and DVD-ROM disks.

Each computing device may include a hard drive for storing data and computer programs, a processing device (for example, a microprocessor), and memory (for example, RAM) for executing computer programs.

Components of different implementations described in this specification may be combined to form other implementations not specifically set forth in this specification. Components may be left out of the systems described in this specification without adversely affecting their operation.

What is claimed:

1. A laser system configured to output an output laser beam to a hydrocarbon-bearing rock formation, the laser system comprising: an optical transmission medium forming a first part of an optical path; a beam transformer forming a second part of the optical path, wherein the beam transformer comprises a transformer element; and a writing head comprising a moving frame, wherein the writing head comprises at least one of a wideband laser, a light-emitting diode, and an electron source configured to emit one or more types of radiation, wherein the writing head further comprises an array configured to alter at least one property of the one or more types of radiation, and wherein the moving frame translates the altered one or more types of radiation to provide the translated altered one or more types of radiation to a discrete location within a volume of the transformer element, wherein an optical property of the transformer element is altered when subjected to the translated altered one or more types of radiation, and wherein the altered transformer element causes alteration of one or more properties of an output laser beam based on an input laser beam input into the beam transformer.

2. The laser system of claim 1, further comprising an analyzer forming a third part of the optical path,
   wherein the analyzer is configured to characterize a profile and energy of the input laser beam.

3. The laser system of claim 1, further comprising a circulator forming a fourth part of the optical path,
   wherein the circulator is configured to minimize or eliminate reflections of the input laser beam.

4. The laser system of claim 1, wherein the transformer element comprises a metamaterial.

5. The laser system of claim 1, where the laser system is integrated into a laser downhole tool for output of the output laser beam to the hydrocarbon-bearing rock formation.

6. The laser system of claim 1, wherein the moving frame comprises a translating frame.

7. The laser system of claim 1, wherein the array comprises at least one of a liquid crystal array and a micro-lens array,
   wherein the moving frame comprises a translating frame or a rotating frame, and
   wherein the at least one of the wideband laser, the light-emitting diode, and the electron source and the at least one of the liquid crystal array and the micro-lens array are mounted on the translating frame or the rotating frame.

8. A method for manipulating a laser beam, the method comprising:
   determining a refractive index map for the laser beam;
   providing one or more types of radiation, emitted from at least one of a wideband laser, a light-emitting diode, and an electron source of a writing head, to an array mounted on a moving frame at a first position,
      wherein the writing head comprises the array configured to alter at least one property of the one or more types of radiation, and
      wherein the moving frame translates the altered one or more types of radiation;
   outputting the translated altered one or more types of radiation from the array to a first discrete location within a volume of a transformer element,
      wherein the translated altered one or more types of radiation alters an optical property of the transformer element based, at least in part, on the refractive index map; and
   altering a property of the laser beam by passing the laser beam through the altered transformer element.

9. The method of claim 8, wherein the one or more types of radiation comprises electromagnetic radiation.

10. The method of claim 8, further comprising:
    passing the laser beam through an analyzer,
       wherein the analyzer is configured to characterize a profile and energy of the laser beam;
    determining an updated refractive index map based, at least in part, on the profile and energy of the laser beam;
    providing the one or more types of radiation, using at least one of the wideband laser, the light-emitting diode, and the electron source, to the array mounted onto the moving frame at a second position;
    outputting the translated altered one or more types of radiation from the array to a second discrete location within the volume of the transformer element based, at least in part, on the updated refractive index map; and
    altering the property of the laser beam by passing the laser beam through the altered transformer element.

11. The method of claim 8, wherein determining the refractive index map comprises using artificial intelligence.

12. The method of claim 8, wherein positioning the moving frame at the first position comprises translating the moving frame.

* * * * *